UNITED STATES PATENT OFFICE.

HENRY A. KOHMAN, TRUMAN M. GODFREY, AND LAUREN H. ASHE, OF PITTSBURGH, PENNSYLVANIA, ASSIGNORS TO WARD BAKING COMPANY, OF NEW YORK, N. Y., A CORPORATION OF NEW YORK.

MANUFACTURE OF BREAD.

1,222,304.     Specification of Letters Patent.     Patented Apr. 10, 1917.

No Drawing.     Application filed August 16, 1916. Serial No. 115,153.

*To all whom it may concern:*

Be it known that we, HENRY A. KOHMAN, TRUMAN M. GODFREY, and LAUREN H. ASHE, all citizens of the United States, residing in Pittsburgh, Allegheny county, State of Pennsylvania, have invented certain new and useful Improvements in the Manufacture of Bread; and we do hereby declare the following to be a full, clear, and exact description of the invention, such as will enable others skilled in the art to which it appertains to make and use the same.

In the manufacture of leavened bread it is common practice to add various milk products for the purpose of enriching the bread and improving the flavor and adding to the bloom or crust color. For this purpose, the milk is either normal whole milk or skimmed milk or more commonly condensed or evaporated milk. We have observed that when milk is added in increasing quantities in a series of dough batches that the fermentation is retarded and that it requires a longer time to aerate the bread than without the addition of milk. Especially is this retarded action of the milk noticeable if it is used in large quantities, say 3 or 4% of milk powder or the equivalent thereof in whole or condensed milk.

We have found, if the milk used in bread is previously subjected to the action of a peptonizing ferment (as, for example, *Bacillus subtilis*,) that instead of retarding the fermentation of the yeast in bread it accelerates it very decidedly. The acceleration is so pronounced that with the use of a normal amount of 1% of skim-milk powder, or the equivalent thereof in whole or condensed milk, only half of the usual quantity of yeast is required to leaven the bread in the usual time under normal conditions.

The treatment of milk with *Bacillus subtilis* is accomplished in the following manner:

A pure culture of the organism is grown in milk, from which it may be conveniently transferred to the milk which it is desired to prepare for bread making. The milk previous to treatment with the organism is preferably pasteurized or sterilized and then inoculated with the pure culture of *Bacillus subtilis*. It is then kept at a suitable temperature of about 30° C. for a period of time sufficient to render the constituents of the milk soluble. This usually requires from 1 to 3 days.

We have found further that, in order to hasten the digestion of the milk with *Bacillus subtilis*, it is desirable to add small quantities of salt and baking soda to the milk prior to its treatment. A suitable quantity of salt for this purpose is four grams in 1000 grams of milk and a suitable quantity of soda is about one gram for the same quantity of milk.

While *Bacillus subtilis* has been found suitable for digesting milk, we do not wish to restrict ourselves to this ferment alone. Thus, we have found that the milk may be treated with *Bacillus mesentericus vulgatus*, and also with *Bacillus mycoides*. Likewise, we have found that certain enzyms, such as pepsin and trypsin, may be used for digesting the milk, although less economically.

We have found further, that certain other milk products which have already been subjected to a peptonizing organism in the course of their manufacture may likewise be used in the dough batch in place of the digested milk. For example, we have found certain types of cheese in which the casein is partially rendered soluble are also suitable for enriching the bread, while, at the same time, they accelerate the fermentation as does the digested milk.

Among the cheeses that have been successfully used for this purpose, are,—cream cheese, Swiss, Limburger, Brie and Camembert. These cheeses, however, we have found to be so hard and stiff that when they are added directly to the dough batch they are not homogeneously incorporated therewith by the usual mixing machines employed in the trade. It has been found, however, that if the cheese is mixed with a melted hardened fat (say, hydrogenized cottonseed oil) having a melting point of about 35 or 40° C., it forms a creamy mixture therewith which is readily incorporated homogeneously into the dough batch during the usual mixing operation. The addition of the hardened fat to the cheese is desirable for the further reason that the fat replaces a part or all of the shortening agents that are ordinarily added to bread. A suitable proportion of cheese to the hardened fat is 10 parts of cheese to 4 or 5 parts of the hardened fat. Of this mixture, we prefer to use about 1 to 1½ lbs. to 100 lbs. of flour.

We have further found that if the cheese is crushed and mixed with flour in the proportion of one part of cheese to two parts of flour, a pulverulent product results which may conveniently be used as an ingredient of the dough batch (in the proportion of say 1% of cheese, by weight, to the flour of the batch) and is readily incorporated therewith during the usual mixing operation.

It will, of course, be understood that casein itself may be converted into a form wherein its nitrogenous and calcium constituents are made available as a yeast food in a starchy medium by treating it (as, for instance, in an emulsion with water) in manner similar to the treatment hereinbefore described for the treatment of milk; and, the casein used for this purpose may be obtained either from sweet milk or butter-milk. When obtained from butter-milk it renders available, for useful purposes, a form of casein which cannot be readily employed to advantage for the ordinary purposes for which casein obtained from sweet milk is used in the arts.

In our opinion, the treated milk products are favorable to the acceleration of the yeast for two reasons: First, that the casein of the milk is rendered soluble, so that its nitrogen content is made available as a yeast food; and secondly, that the calcium of the milk is made more available for the use of the yeast.

We have found also, that other products which are rich in nitrogen may be digested so that the nitrogen contained therein is made available as a yeast nutriment. For example, we have found that ordinary wheat gluten which is a by-product in wheat starch factories, may be digested with concentrated hydrochloric acid and that under these conditions various soluble amino acids are formed which may serve as yeast nutriments in bread making. One of the principal acids thus obtained from wheat gluten is glutamic acid hydrochlorid which, when added to the dough batch is found to give a desired acceleration of the fermentation. Likewise other nitrogenous products, such as beans, peas, and cocoanut press-cake (i. e., the cake left after the usual pressing out of the cocoanut oil) when digested so as to render the proteins soluble, may serve as a supply of nitrogenous food for the yeast.

It is characteristic of wheat gluten, beans, peas, and cocoanut press-cake, that they yield, in accordance with the present invention, products which are relatively high in nitrogen in comparison to the carbohydrates present, so that the use of these nitrogenous products, in available form as a yeast food in starchy material, is not complicated by any endeavor to adapt their carbohydrates to special utilization in the bread manufacture,—in connection with which the carbohydrate present subserve a negligible rôle.

What we claim is:

1. In the manufacture of leavened bread, the method of economizing in the amount of yeast normally employed, which consists in treating nitrogenous material to convert it into a form in which it is rich in nitrogen available as yeast food in a starchy medium and low in carbo-hydrates, incorporating the converted material with the flour, yeast and other ingredients of the dough batch, and fermenting the mixture; substantially as described.

2. In the manufacture of leavened bread, the method of economizing in the amount of yeast normally employed, which consists in treating nitrogenous material containing calcium to convert it into a form in which it is rich in nitrogen and calcium both available as yeast food in a starchy medium, incorporating the converted material with the flour, yeast and other ingredients of the dough batch, and fermenting the mixture; substantially as described.

3. In the manufacture of leavened bread, the method of economizing in the amount of yeast normally employed, which consists in incorporating with the flour, yeast, and other ingredients of the dough batch to be fermented, milk material whose nitrogen and calcium constituents are in available condition to serve as yeast food in a starchy medium and fermenting the batch; substantially as described.

4. In the manufacture of leavened bread, the method of economizing in the amount of yeast normally employed, which consists in incorporating with the flour, yeast, and other ingredients of the dough batch to be fermented, a casein material in available condition to serve as yeast food in a starchy medium, and fermenting the batch; substantially as described.

5. In the manufacture of leavened bread, the method of economizing in the amount of yeast normally employed, which consists in incorporating with the flour, yeast, and other ingredients of the dough batch to be fermented, cheese in available condition to serve as yeast food in a starchy medium, and fermenting the batch; substantially as described.

6. In the manufacture of leavened bread, the method of economizing in the amount of yeast normally employed, which consists in incorporating with the flour, yeast, and other ingredients of the dough batch to be fermented, a mixture of cheese and melted fat, the cheese being in available condition to serve as yeast food in a starchy medium, and fermenting the batch; substantially as described.

In testimony whereof we affix our signatures.

HENRY A. KOHMAN.
TRUMAN M. GODFREY.
LAUREN H. ASHE.

Witnesses:
RICHARD DANIEL,
HELEN R. BROWNE.